United States Patent [19]

Luty et al.

[11] Patent Number: 4,672,619

[45] Date of Patent: Jun. 9, 1987

[54] COLOR CENTERS FOR TUNABLE LASERS IN THE NEAR INFRARED REGION

[75] Inventors: Fritz Luty; Werner Gellermann, both of Salt Lake City, Utah

[73] Assignee: University of Utah Research Foundation, Salt Lake City, Utah

[21] Appl. No.: 379,403

[22] Filed: May 18, 1982

[51] Int. Cl.$^4$ .............................................. H01S 3/16
[52] U.S. Cl. ....................................... 372/42; 372/68
[58] Field of Search ........................................... 372/42

[56] References Cited

PUBLICATIONS

Gellermann et al.; "Optical Properties and Stable, Broadly Tunable CW Laser Operation of New $F_A$—Type Centers in $Tl^+$-Doped Alkali Halides", Optics Comm. es", Optus Comm. vol. 39, No. 6, Nov. 15, 1981, pp. 391-395.

Masunaga et al.; "Pressure Effect of Emission Spectra in Alkali Halide Crystals Containing $Tl^+$-Ions", Journ. of Phys. Soc. of Japan, vol. 43, No. 6, Dec. 1977.

Primary Examiner—William L. Sikes
Assistant Examiner—Léon Scott, Jr.
Attorney, Agent, or Firm—Workman, Nydegger & Jensen

[57] ABSTRACT

Stable color centers capable of laser emission in the near infrared region of the optical spectrum are provided in alkali halide host crystals containing monovalent heavy metal cation impurities such as thallium, gallium, indium, silver and copper. The laser active color centers are formed by exposing the crystal to ionizing radiation followed by irradiation with light having a wavelength absorbed by the F centers. The resulting material is capable of stable, broadly tunable laser operation with high power output in the near infrared region. Oscillation on a single mode can be easily obtained.

24 Claims, 15 Drawing Figures

COLOR CENTERS FOR TUNABLE LASERS IN THE NEAR INFRARED REGION

BACKGROUND

1. The Field of the Invention

The present invention relates to tunable solid state laser materials. More particularly, the present invention is directed to novel color centers in alkali halide crystals which are useful in tunable laser operation in the near infrared region of the optical spectrum.

2. The Prior Art

Various solid state laser materials have been developed in recent years that may be pumped in the visible or near ultraviolet regions of the optical spectrum by readily available ion lasers or the like, and which emit laser light at a longer wavelength. Inexpensive and easily operated laser sources at wavelengths in the near infrared region of the optical spectrum have been earnestly sought after because of their applications in atomic and molecular spectroscopy, photochemistry, and fiber optic communications.

The most promising approach to achieving such wavelength laser sources has been the development of color center laser materials. which incorporate point defects into alkali halide host crystals in order to introduce electronic transitions into the forbidden energy gap of the host crystal. In addition to emitting light in the near infrared region of the optical spectrum, color center materials are capable of producing laser light of extremely narrow linewidths, and yet, the lasers are wavelength tunable within relatively broad limits. As a result, investigators have considered color center lasers to be more promising than other tunable coherent light sources in the infrared region of the spectrum, such as diode lasers and optical parametric oscillators. Diode lasers are disadvantageous because they are capable of only relatively low output power, and also have high spatial beam divergence. Optical parametric oscillators avoid these problems, but are complex and quite expensive. Moreover, neither alternative system is capable of producing the narrow linewidths which may be obtained from color center lasers without significant losses of laser power output.

Color center lasers having various degrees of usefulness and efficiency have been developed utilizing alkali halide host crystals doped with lithium or sodium, which have been introduced into the host crystal so as to allow the formation and the stabilization of particular point defects.

In these alkali halide host crystals, most of the electronic transitions, which are induced by the point defects, are strongly coupled to the crystal lattice and its vibrations. As a result, the optical transition from the ground state to the excited state provides a new spatial distribution of the electron which is no longer in equilibrium with the lattice, thus exerting forces on the surrounding ions. This leads to strong lattice vibrations which are relieved by relaxation into a new electron-lattice configuration, termed the relaxed excited state. After the radiative lifetime, optical emission occurs, and a new non-equilibrium state occurs. Again, lattice vibrations result in relaxation, this time back to the relaxed ground state.

This strong coupling between the electron and the lattice, termed "electron-phonon coupling" results in relatively broad absorption and emission bands separated by a significant shift in wavelength (termed the "Stokes shift"). This Stokes shift is very advantageous because excitation may be accomplished at a wavelength emitted by readily available pump lasers, yet emission will occur at some longer wavelength.

Laser activity only occurs when an appropriate combination of impurity cation and host crystal is used. Heretofore, three basically different types of color centers have been developed which have been shown capable of laser activity. All three types depend upon the presence of "F centers," which are anionic vacancies in the crystal lattice filled by an electron.

One of the earlier types of color center, termed an "$F_A$ center," consists of an F center associated with an impurity cation. A second type, termed an "$F_B$ center," consists of an F center associated with two impurity cations. The third type of color center reported heretofore, termed the "$F_2^+$ center," consists of a pair of neighboring anion vacancies which share a single electron.

Laser materials of the $F_A$ or $F_B$ type have shown a relatively large Stokes shift, i.e., there is a rather large difference between the frequency of absorption and the frequency of emission. Although such large Stokes shifts generally result in low efficiency, workable and reliable lasers of these types have been demonstrated and are capable of tunable emission in the near infrared spectral range of about 2.2 to 3.3 micrometers.

The $F_2^+$-type centers do not have such a large Stokes shift. As a result, they are more efficient and also allow selection of tunable emission at shorter wavelengths within the near infrared region. Unfortunately, these types of centers are optically and/or thermally unstable, and thus difficult and expensive to produce and handle. Although over a dozen different systems of this type have been found capable of laser operation, none have proven stable enough for routine use.

From the foregoing, it may be seen that much of the near infrared region of the optical spectrum remains uncovered by the emission bands of presently available stable color center lasers. Accordingly, it would be a significant contribution to the field of tunable lasers to provide new optically and thermally stable laser-active color centers having a Stokes shift into the near infrared region of the optical spectrum.

BRIEF SUMMARY AND OBJECTS OF THE INVENTION

The present invention is directed to laser materials containing novel laser-active color centers utilizing monovalent heavy metal cations as impurities in alkali halide host crystals. Various crystals incorporating thallium as an impurity cation have exhibited both tunable and stable laser activity in the near infrared region of the optical spectrum.

The novel color centers are formed by exposing crystals containing the monovalent heavy metal cationic impurities to ionizing radiation followed by irradiation with light having wavelengths which are absorbed by the F centers.

It is, therefore, a general object of the present invention to provide improved color center laser crystals capable of laser activity in the near infrared region of the optical spectrum.

It is another object of the present invention to provide improved color center laser crystals that are capable of stable laser operation and which may be stored at room temperature without loss of laser capability Still further objects of the present invention are to provide improved color center laser crystals which give relatively high continuous wave output power and a relatively broad tuning range.

These and other objects and features of the present invention will become more fully apparent from the following description and appended claims taken in conjunction with the accompanying drawings.

DETAILED DESCRIPTION OF THE INVENTION

The present invention is directed to stable laser materials containing novel color centers that provide tunable emissions in the infrared region of the optical spectrum. The color centers of the present invention are formed by doping conventional alkali halide host crystals with monovalent heavy metal cations, e.g., thallium, indium, gallium, silver, and copper, and then subjecting the doped crystal to ionizing radiation followed by treatment with light at F-band frequencies.

General Discussion

Figure 1:
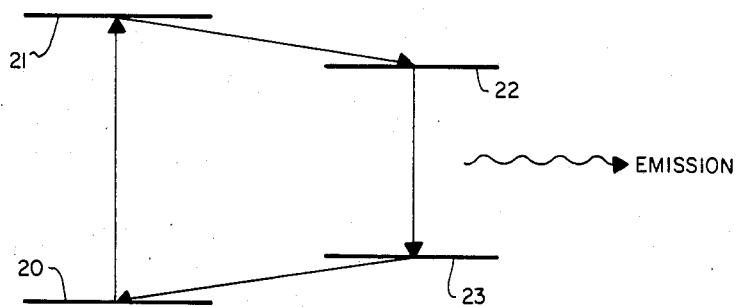
FIG. 1 is a schematic representation of a typical four energy-level system of a workable laser material.

When considering a particular optical transition cycle of a color center, it is convenient to discuss it in terms of a theoretical four energy-level structure, such as that illustrated in FIG. 1. There, energy level 20 represents a particular relaxed ground state of a given color center. Upon exposure to ligt at a frequency in the absorption band, an optical transition occurs from ground state 20 to the excited state 21. As mentioned previously, this excitation results in a new spatial electron distribution which is not in equilibrium with the lattice, thereby leading to strong lattice vibrations which are relieved only by relaxation into a new electron-lattice configuration. In FIG. 1, energy level 22 represents this relaxed excited state. After the radiative lifetime, optical emission occurs and the system passes to the unrelaxed ground state 23, another non-equilibrium state which quickly relaxes to ground state 20. The color center system is thus prepared for reabsorption and a repeat of the cycle.

Although this four energy level structure is theoretical, a situation very similar to that depicted is required for the operation of efficient tunable lasers. Since the relaxation steps of the color center system occur. more than four orders of magnitude faster than the radiative transition, the optical cycle of a color center substantially approximates the ideal case for laser applications.

As discussed above, three different types of color centers have been developed heretofore. The first (termed the $F_A$ center) involves an impurity cation associated with an anion vacancy containing an electron. This is shown schematically in FIG. 2A. There, the impurity cation 24 is shown as being smaller than the host lattice cation 25. The vacancy 26 is shown with shading to indicate the presence of an electron within the vacancy. In the past, researchers have been successful in incorporating lithium and sodium impurities into host crystals so as to form $F_A$ centers. However, it has been found that only those combinations of host crystal and impurity which allow the relaxed excited configuration shown in FIG. 2B (termed the "saddle point configuration") will give laser emission. In the saddle point configuration, an anionic host ion 27 assumes a new position between the impurity cation 24 and the adjacent host crystal cation 25a.

Figure 2A:
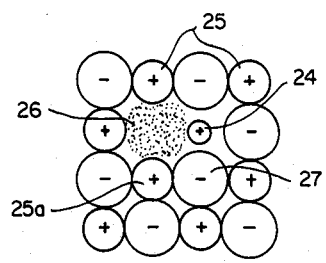
FIG. 2A is a schematic representation of an $F_A(II)$ color center in the ground state.
Figure 2B:
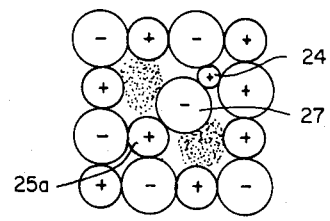
FIG. 2B is a schematic representation of an $F_A(II)$ color center in the relaxed excited state.

$F_A$ color centers capable of forming the saddle point configuration of FIG. 2B are known as $F_A(II)$ centers. Centers incapable of forming the saddle point configuration, and thus incapable of laser activity, have been termed $F_A(I)$ centers. Although both sodium and lithium ions have been incorporated into host crystals so as to form $F_A$ centers, only the smaller-sized lithium ion has formed the laser-active $F_A(II)$-type center. A single sodium ion has been found to be too large to allow formation of the saddle point configuration.

Figure 3A:
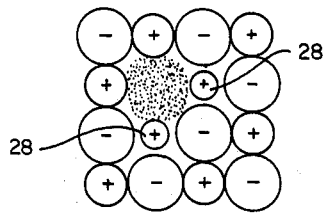
FIG. 3A is a schematic representation of an $F_B(II)$ color center in the ground state.
Figure 3B:
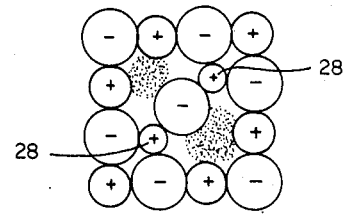
FIG. 3B is a schematic representation of an $F_B(II)$ color center in the relaxed excited state.

FIGS. 3A and 3B schematically depict an $F_B(II)$ center in the ground state and the relaxed excited saddle point configuration, respectively. Again, only those combinations of host crystal and impurity 28 which allow formation of the saddle point configuration (FIG. 3B) have been demonstrated to have laser activity. $F_B(II)$-type systems have been formed in only two heavily doped host crystals, potassium chloride and rubidium chloride, both of which utilize sodium as an impurity cation.

Figure 4A:
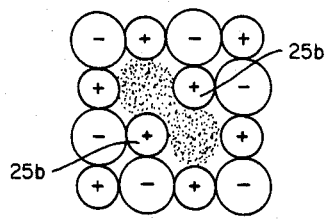
FIG. 4A is a schematic representation of an $F_2^+$ color center in the ground state.
Figure 4B:
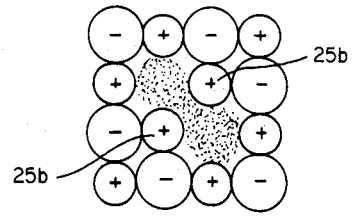
FIG. 4B is a schematic representation of an $F_2^+$ color center in the relaxed excited state.

Finally, the $F_2^+$ color center is schematically depicted in FIGS. 4A and 4B in its respective ground and relaxed excited states. Here, the representation of the relaxed excited state appears substantially the same as the ground state. The $F_2^+$ center consists of two anion vacancies binding one electron. Thus, the two cations 25b are host crystal cations. In contrast to the electrically neutral $F_A$ and $F_B$ centers, the $F_2^+$ center is an ionized center. For its production, it is necessary that stable electron traps be incorporated into the host crystals. As a result, the processes for producing $F_2^+$ centers are rather complex. Furthermore, it has been found that the $F_2^+$ center systems are optically and/or thermally unstable. Thus, the $F_2^+$ systems of the prior art have become incapable of acceptable levels of laser activity after only a few minutes or hours of use.

The Novel Color Centers

The present invention is directed to improved, novel color centers which incorporate monovalent heavy metal cations as impurities in conventional alkali halide host crystals, and in particular, the use of thallium, indium, and gallium from Group IIIb of the Periodic Table, and silver and copper from Group Ib as the presently preferred monovalent heavy metal cations.

As previously discussed, in the past it has not proven possible to form $F_A(II)$ systems (having laser activity) when sodium is used as the impurity cation; this is because sodium is too large in size to allow formation of the saddle point configuration illustrated in FIG. 2B. Thus, those skilled in the art have recognized the extreme importance of the size of the impurity cation as a factor in determining laser activity.

Heavy metal silver cations are generally larger in size than either lithium or sodium. Accordingly, it would not be expected that the use of such heavy metal cations would form either an $F_A(II)$ or an $F_B(II)$ system.

As can be seen from the foregoing, those skilled in the art have heretofore directed their research towards considerations involving the size of the cation impurities, believing it necessary to achieve the saddle point configuration of FIGS. 2B and 3B. In the present invention, emphasis has been shifted from the traditional view of using smaller-sized cation impurities in the color centers, to the use of cation impurities having a higher electron affinity. It is believed that the use of such impurity cations having a higher electron affinity leads to a large downward shift of the energy state which corresponds to a transition which is polarized parallel to the axis of the color center, making this shifted state the lowest energy state after the relaxation process. Accordingly, it is believed that the emission of these centers is strongly polarized and has high radiative transition probabilities. and thus is suitable for laser systems.

Cations having electron affinities higher than the alkali cation impurities used in conventional color centers. include such heavy metal cations as thallium, gallium. indium, silver, and copper. In Table I, the electron affinities of these various cations are shown in comparison to potassium when incorporated into a potassium chloride host lattice.

TABLE I

| Cation | Electron Affinity (eV) |
| --- | --- |
| $K^+$ | 0 |
| $Na^+$ | 0.8 |
| $Li^+$ | 1.1 |
| $In^+$ | 1.4 |
| $Ga^+$ | 1.6 |
| $Tl^+$ | 1.7 |
| $Ag^+$ | 3.2 |

TABLE I-continued

| Cation | Electron Affinity (eV) |
| --- | --- |
| $Cu^+$ | 3.4 |

The significance of this difference in electron affinities is that as electron affinity increases, the center electron is distributed more and more to the impurity cation and less and less to the vacancy. Thus, in an $F_A$ system incorporating sodium or lithium in a potassium chloride host lattice, the electron in its ground state is found primarily in the vacancy. This is illustrated in FIG. 2A by the shading, which indicates the distribution of the electron to be restricted essentially to the vacancy.

Figure 5:
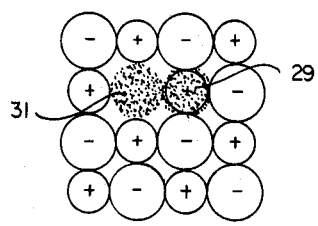
FIG. 5 is a schematic representation of an $F_A$-type color center incorporating a monovalent impurity cation having an electron affinity such that the electron is shared approximately equally between the impurity cation and the vacancy.
Figure 6:
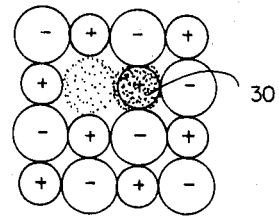
FIG. 6 is a schematic representation of an $F_A$-type color center incorporating a monovalent impurity cation having an electron affinity such that the electron is primarily found around the impurity cation.

In an $F_A$ system incorporating cations having a strong electron affinity (such as copper or silver), it would be expected that the electron has a low probability of being found in the vacancy, as represented in FIG. 6, where the shading is shown to be heaviest around the impurity cation 30. In the case of thallium, electron paramagnetic resonance (hereinafter EPR) studies have shown that the electron is shared approximately equally between the vacancy and the thallium impurity cation. This is schematically represented in FIG. 5, where the shading shows that the thallium ion 29 shares the electron approximately equally with the vacancy 31.

It should be noted that these monovalent heavy metal cation color centers are electrically neutral. As a result, the production of these centers is less difficult than the formation of $F_2^+$-type centers which require stabilizing electron traps.

For purposes of understanding the present invention, specific reference will be made to alkali halide hosts incorporating thallium color centers. Nevertheless, it will be appreciated that the same principles are applicable to other monovalent heavy metal cations which are included within the scope of the present invention.

The alkali halide crystals of the present invention incorporating thallium as a cationic impurity were formed according to conventional crystal growing techniques: powdered alkali halide salt and thallium salt were mixed and heated in a vacuum until melted, after which an appropriate seed crystal was introduced and a single crystal grown. In order to have a sufficient number of color centers for laser activity, the concentration of the thallium cation impurities is preferably in the range of about 0.05 to about 0.5 mole percent, with the most preferable concentration being about 0.2 mole percent. As in conventional laser systems, the host alkali ions are preferably selected from the group consisting of potassium, sodium, and rubidium, and the halide ions are preferably selected from the group consisting of fluoride, chloride, bromide, and iodide.

After crystal formation, small platelets having dimensions of about 2 mm by 10 mm by 10 mm were cleaved from the boule and manually polished to optical quality in a conventional manner by using a slurry of ethanol and aluminum oxide powder having a particle size of about 0.3 micrometers applied to a cloth pad.

Figure 7:
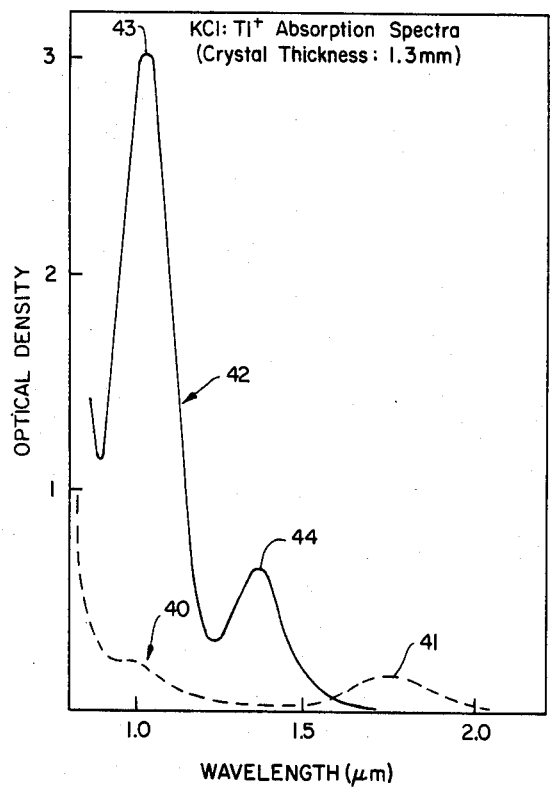
FIG. 7 is an absorption spectra of a $KCl:Tl^+$ crystal at 77° K. within the scope of the present invention, such that the dashed line represents absorption of the crystal after electron beam irradiation and the solid line represents absorption following exposure of the crystal to white light at 230° K.

The polished platelets were then placed in aluminum foil and exposed to ionizing radiation (e.g. an electron beam) for several minutes on each side in order to form a high density of anion vacancies, F centers, and other defects. In FIG. 7. an absorption spectra of a thallium-doped potassium chloride system ($KCl:Tl^+$) after exposure to an electron beam is graphically represented by dashed line 40. Weak band 41 centered at 1.76 micrometers is attributable to the formation of $Tl_2^+$ centers.

Next, the crystals were exposed to light having wavelengths overlapping the F center absorption band at temperatures sufficient to allow diffusion of anion vacancies in the crystal (these temperatures are well known for the various host crystals). This procedure allows aggregation of anion vacancies with $Tl^+$ defects. thereby forming the color centers of interest.

The absorption spectra of the same thallium-doped potassium chloride crystal used to obtain the spectra shown as dashed line 40 in FIG. 7, is shown as line 42 (also in FIG. 7) after this light irradiation procedure. This spectra shows a strong absorption band 43 centered at 1.04 micrometers, and a weak band 44 at 1.36 micrometers, the latter being the well-known absorption band for $F_2^+$ centers. It may be seen that $Tl_2^+$ absorption band 41 at 1.76 micrometers (see dashed line 40 of FIG. 7) has disappeared as a result of the light irradiation procedure.

Inasmuch as the $F_2^+$ centers are unstable, it has been found that the absorption band at 1.36 micrometers could be removed by heating the crystal. Hence, room temperature heating has been found to be effective in all crystals studied.

An alternative method for forming the novel color center would be to expose the platelets to ionizing radiation at a temperature which allows for diffusion of the anion vacancies. This procedure reduces the need for exposure of the crystal to F-band light and concurrent warming.

Figure 8:
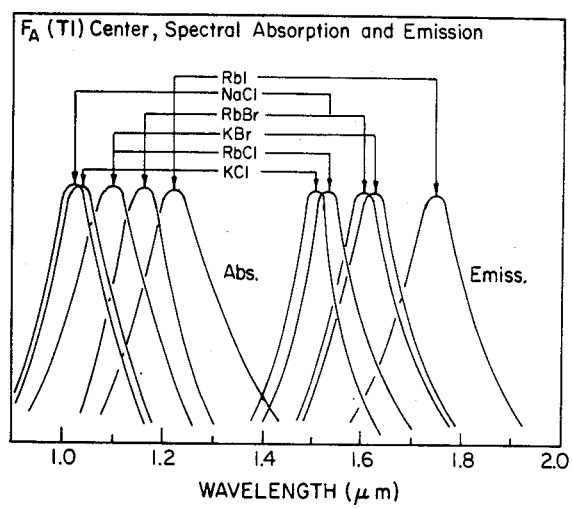
FIG. 8 is a graphical representation of absorption and emission bands of the low energy transitions of a laser-active thallium color center in seven different alkali halide host crystals at 77° K.

The novel color center crystals of the present invention have been found to be capable of stable laser operation in the infrared region of the optical spectrum; moreover, these novel color centers can be effectively pumped by the 1.064 micrometer line of a conventional ($Nd^{3+}$:YAG) laser. FIG. 8 shows spectral absorption and emission data for various host crystals incorporating thallium as a doped impurity. As seen from this spectral data, the emission bands cover the important wavelength range from about 1.4 to about 1.9 micrometers. Further, the emission spectra for each crystal ranges over a significant portion of this optical region. FIG. 8 also shows that the absorption bands of most of these systems may be pumped by the 1.064 and 1.32 micrometer lines of a $Nd^{3+}$:YAG laser.

Figure 9:
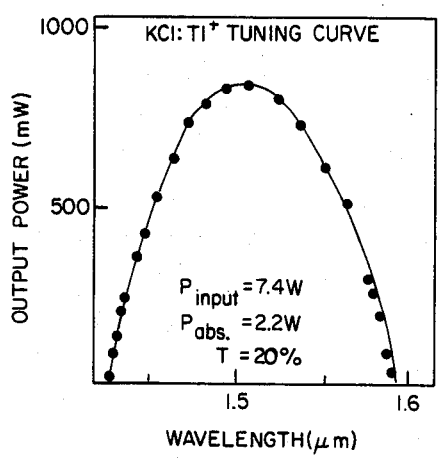
FIG. 9 is a graphical representation of the tuning curve for a $KCl:Tl^+$ laser crystal within the scope of the present invention.
Figure 10:
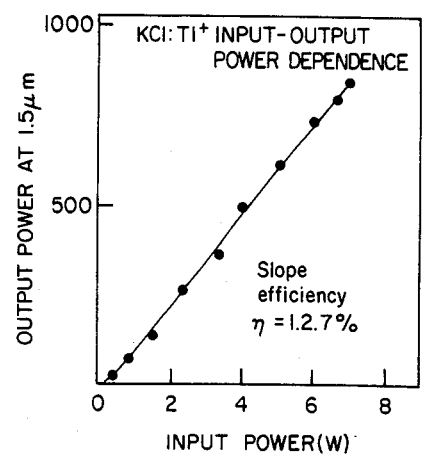
FIG. 10 is a graphical representation of the relationship of output power on input power for a $KCl:Tl^+$ laser crystal within the scope of the invention.

Other characteristics of the thallium-doped potassium chloride system are shown in FIGS. 9 through 12. FIG. 9 illustrates the tuning curve of a KCl:$Tl^+$ laser system, and FIG. 10 illustrates the dependency of laser output power upon the input power of the system. These two Figures are explained in further detail in connection with the discussion which follows in connection with Example I.

Figure 11:
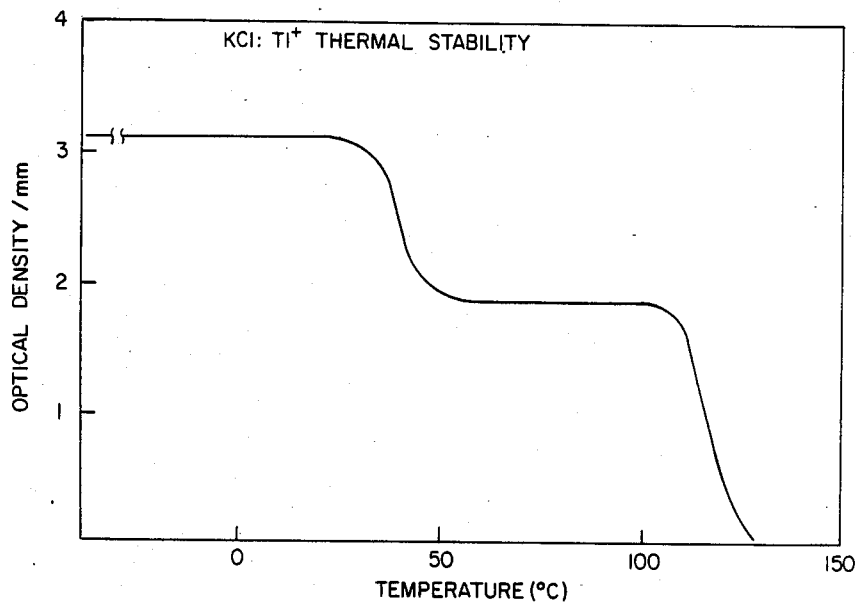
FIG. 11 is a graphical representation of the thermal stability of the laser active thallium color center in a $KCl:Tl^+$ crystal.
Figure 12:
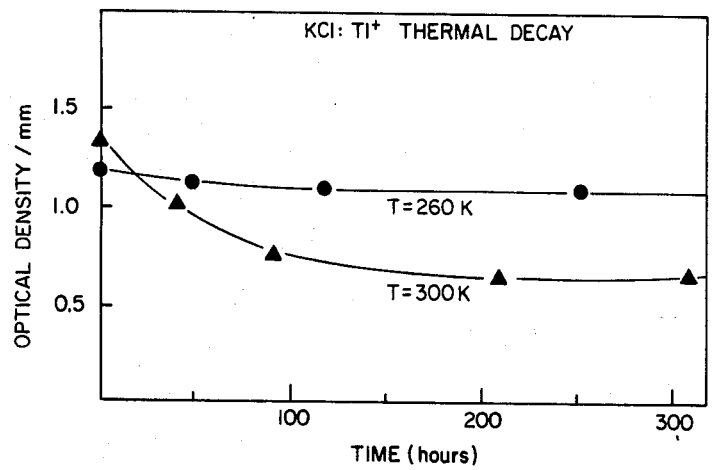
FIG. 12 is a graphical representation of the thermal decay of a laser-active thallium color center in a $KCl:Tl^+$ crystal at both 260° K. and 300° K.

FIG. 11 illustrates the stability of the KCl:$Tl^+$ system as a function of crystal temperature, and FIG. 12 illustrates the thermal decay of the thallium color center as a function of time.

Thus, FIG. 11 illustrates that the KCl:$Tl^+$ crystal is stable until it is heated to about 45° C. A high percentage of the novel color centers in this crystal remain stable until the crystal is heated to about 115° C. FIG. 12 illustrates the thermal stability of the novel color centers of the KCl:$Tl^+$ crystal when stored for extended periods at room temperature (300° K.), and in a refrigerator (260° K.). The initial slow thermal decay at 300° K. (room temperature) levels off after a few days and leaves acceptable amounts of stable laser-active centers. By storing the crystals in a refrigerator at 260° K., the partial decay can be slowed drastically. The thallium color centers have also proven extremely stable while lasing, even under extended periods of operation and high pump power levels.

It can be clearly seen from FIGS. 11 and 12 that the novel thallium color centers have exceptional thermal stability. Crystals having these laser-active centers may be stored indefinitely at room temperature without adverse effect.

The thallium color centers produced according to the present invention are believed to consist of a single impurity cation, an anion vacancy in the host crystal, and a shared electron, as illustrated in FIG. 6. While such a color center might be termed an $F_A$ center, the thallium ion is too large to allow for the formation of the saddle point configuration depicted in FIG. 2B, therefore, it is not an $F_A$(II) center. Yet, the thallium color center of the present invention is capable of laser activity and should not, therefore, be termed an $F_A$(I) center. Accordingly, the new center may be referred to as an $F_A$(III) or $F_A$(Tl) center. It should be noted that recently other notations have also been used in the literature to designate this type of center: for example, $Tl°_F$, $Tl°[\square]$, and $Tl°(1)$. Each of these notations is an attempt to show that the electron in the vacancy is shared with the thallium to a significant extent (see the representation of FIG. 6).

In characterizing the novel thallium color center, polarized emission measurements have shown that the transition dipoles of the absorption and emission processes of the thallium color center are polarized parallel to each other and to a [100] crystallographic direction. This indicates that the $Tl^+$ ion and anion vacancy are in [100] neighboring positions.

It is believed that the absorption and emission bands shown in FIG. 8 for various crystal systems correspond to the lowest energy absorptions of the novel color centers. Higher energy absorptions with different polarization behavior would be expected. Confirming these expectations in the KCl:$Tl^+$ system, higher energy absorption bands have been observed at 0.34, 0.55 and 0.72 micrometers.

In another experiment, excitation of the novel crystal systems with krypton ion laser lines in the absorption band around 0.55 micrometers produced continuous wave laser operation, although a rapid power fading was observed.

Following are representative examples showing the formation and use of novel color centers within the scope of the invention:

EXAMPLE I

About 100 grams of potassium chloride with three mole percent thallium chloride were melted and recrystallized into a single crystal using conventional crystal growth techniques. The resultant KCl:$Tl^+$ crystal system had a concentration of thallium cations of about 0.2 mole percent. Crystal platelets of about 2 mm by 10 mm by 10 mm were then cleaved from the boule and manually polished to optical quality using slurries of Linde A and B (aluminum oxide powder of 0.3 micrometer and 0.05 micrometer sizes. respectively) and pure ethanol on a microcloth pad.

The crystal platelets were then mounted on the copper cold finger of an optical cryostat and each side of each platelet was exposed to a 1.8 MeV, 1.7 microamperes/$cm^2$ electron beam for three minutes through a 120 micrometer thick aluminum window. During this electron irradiation, the crystal temperature was maintained at about 77° K.

After exposure to the electron beam, the absorption of the crystal was recorded in an absorption spectrophotometer. While monitoring the 1.04 micrometer absorption band of the thallium color centers, the crystal was warmed to 230° K. during exposure to the light of a tungsten lamp. This step produced an aggregation of F centers with thallium ions so as to form the novel thallium color centers. After approximately three minutes of light exposure, the aggregation into the thallium color centers leveled out and the light exposure was stopped. Thereafter, the optical density of the thallium color center at 1.04 micrometer was approximately 0.5 per millimeter of crystal.

The crystal was subsequently warmed to room temperature, removed from the cryostat, reduced in size to about 2 mm by 8 mm by 6 mm, and mounted into a laser cavity. In order to avoid photochromic processes in the material, crystal handling was performed in dim room light.

The laser resonator comprised an astigmatically compensated resonator formed by (1) an input coupling lens with a 37.8 millimeter focal length. which was highly reflective for 1.5 micrometer and highly transmissive for the pump light, (2) a highly reflective folding mirror (50 millimeter curvature radius) and a (3) grating in Littrow configuration with 22% output coupling around 1.5 micrometer in zeroeth order, thereby serving as both tuning element and an output coupler.

The pump source was a $Nd^{3+}$:YAG laser operating in the $TEM_{oo}$ mode with the electric field vector oriented parallel to the plane formed by the folded optical axis of the resonator. The laser active material was also oriented so as to provide a [100] crystallographic axis in this plane.

The tuning curve and input power versus output power characteristics for the KCl:Tl+ laser of Example I are graphically represented in FIGS. 9 and 10. When pumped with 7.4 watts of continuous wave input power, the crystal absorbed 2.2 watts of power in a single pass and was tunable from approximately 1.42 to 1.58 micrometers. Output power in the peak of the tuning range was found to be at about 850 Millwats. From the input power-output power dependance, an overall slope efficiency of 12.7% was determined, as reflected in FIG. 10.

It was discovered that the threshold pump power was 200 milliwatts for the KCl:Tl+ crystal of Example I. It was also found that laser operation continued without the need for additional light irradiation treatment steps; the output of the laser using the KCl:Tl+ was observed to be highly stable over a test period of 20 hours.

It was also determined from measurements of the spectral profile of the laser emission, that when using a grating alone, the laser was oscillating on two modes having a frequency separation of 1.9 GHz. After insertion into the resonator of a Fabry Perot etalon with 20% reflectivity, oscillation was obtained on a single mode.

EXAMPLE II

About 60 grams of potassium bromide along with 0.8 mole percent thallium bromide were melted and grown into a single crystal using a conventional method of crystal growth. The resultant KBr:Tl+ crystal system had a concentration of thallium ions of about 0.2 mole percent. A crystal platelet of about 2 mm by 10 mm by 10 mm was then cut from the boule and manually polished to optical quality using the same methods as described with respect to the crystal of Example I.

The crystal platelet was then wrapped in a single layer of aluminum foil (40 micrometer thickness), sealed, and exposed to a 1.8 MeV 0.5 microamperes/$cm^2$ electron beam for three minutes on each side. During this irradiation, the crystal was cooled to a temperature between 170° and 210° K. by a stream of dry nitrogen gas.

After coloration the crystal was warmed to room temperature, cleaved to a size of approximately 2 mm by 8 mm by 6 mm, and mounted into the laser cavity. As in Example I crystal handling was performed in dim room light.

The laser resonator consisted of an astigmatically compensated, x-type four mirror configuration, formed by two plane mirrors with dielectric coatings and two gold coated spherical mirrors with a curvature radius of 75 millimeters. A $Nd^{3+}$:YAG pump laser, operating at 1.06 micrometer in the $TEM_{oo}$ mode, was coupled into the resonator through one of the plane mirrors which was highly transmissive for the pump wavelength and highly reflective for the thallium color center emission which occurred at around 1.6 micrometers. The second plane mirror served as an output coupler. Two different output coupling mirrors were tried, having 5% and 15% transmission, respectively, at 1.6 micrometers. A Brewster-cut sapphire prism was inserted into the resonator for use as a tuning element.

The thallium color centers were produced by illuminating for about ten minutes the crystal at 230° K., while inside the laser cavity, with light in the F center absorption band which was supplied by a filtered tungsten lamp. After this step, the crystal was cooled to the laser operating temperature of 77° K.

As with the crystal of Example I, it was found that optimum laser operation occurred when the electric vector of the pump beam was parallel to both a [100] crystallographic axis of the crystal and to the plane determined by the folded optical axis of the resonator.

When pumped by a 1.7 watt continuous wave pumping laser, the crystal absorbed 0.95 watts at 1.06 micrometer in a single pass. The KBr:Tl+ laser was tunable from 1.522 to 1.738 micrometers and yielded 44 milliwatts at the peak, which occurred at about 1.6 micrometers when using the output coupler having 5% transmission. When the 15% transmission output coupler was used, the peak power increased to 90 milliwatts, although the total tuning range decreased slightly on the long wavelength side. The output power was found to increase linearly with increasing pump power, up to the maximum of 1.8 watts of pump power applied. The slope efficiency was determined to be 6%.

As in Example 1, continuous wave, broadly tunable and stable laser operation was possible without auxiliary light irradiation treatments.

EXAMPLE III

Another laser-active thallium color central crystal within the scope of the present invention was prepared by incorporating thallium ions into a sodium chloride host crystal in the same manner as described with respect to potassium chloride in Example I. The resultant NaCl:Tl+ crystal system had a thallium cation concentration of about 0.1 mole percent. The low energy absorption band and the flourescence emission band of the laser active NaCl:Tl+ crystal system are shown in FIG. 8.

EXAMPLE IV

Another laser-active crystal was formed by the method described in Example I, except that rubidium chloride was substituted for potassium chloride. The resultant RbCl:Tl+ crystal system had a thallium cation concentration of about 0.1 mole percent. The low energy absorption band and the fluorescence emission band of the laser active RbCl:Tl+ crystal system are shown in FIG. 8.

EXAMPLE V

Another thallium color center crystal within the scope of the present invention were prepared according to the method described in Example I, except that thallium bromide was substituted for thallium chloride, and rubidium bromide was substituted for potassium chloride. The resultant RbBr:Tl+ crystal system had a thallium cation concentration of about 0.1 to 0.2 mole percent. The low energy absorption band and the fluorescence emission band of the RbBr:Tl+ crystal system are shown in FIG. 8.

EXAMPLE VI

Another thallium color center crystal within the scope of the present invention was prepared according to the method described in Example I, except that thallium iodide was substituted for thallium chloride, and rubidium iodide was substituted for potassium chloride. The resultant RbI:Tl+ crystal system had a thallium cation concentration of 0.1 to 0.2 mole percent. The low energy band and fluorescence emission band for the RBI:Tl+ crystal system are shown in FIG. 8.

EXAMPLE VII

Other thallium color center crystals within the scope of the present invention are made according to the procedures set forth with respect to Example I, except that thallium ions are incorporated into a host crystal that is any one of sodium fluoride, sodium bromide, sodium iodide, potassium fluoride, potassium iodide, and rubidium fluoride, thereby providing the respective NaF:Tl+, NaBr:Tl+, NaI:Tl+, KF:Tl+, KI:Tl+, and RbF:Tl+ crystal systems.

EXAMPLE VIII

Gallium color center crystals within the scope of the present invention are made according to the procedures set forth with respect to Example I, except that gallium ions are incorporated into a host crystal that is any one of sodium fluoride, sodium chloride, sodium bromide, sodium iodide, potassium fluoride, potassium chloride, potassium bromide, potassium iodide, rubidium fluoride, rubidium chloride, rubidium bromide, and rubidium iodide, thereby providing the respective NaF:Ga+, NaCl:Ga+, NaBr:Ga+, NaI:Ga+, KF:Ga+, KI:Ga+, RbF:Ga+, RbBr:Ga+, and RbI:Ga+ crystal systems.

EXAMPLE IX

Indium color center crystals within the scope of the present invention are made according to the procedures set forth with respect to Example I, except that indium ions are incorporated into a host crystal that is any one of sodium fluoride, sodium chloride, sodium bromide, sodium iodide, potassium fluoride, potassium chloride, potassium bromide, potassium iodide, rubidium fluoride, rubidium chloride, rubidium bromide, and rubidium iodide, thereby providing the respective NaF:In+, NaCl:In+, NaBr:In+, NaI:In+, KF:In+, KI:In+, KCl:In+, RbF:In+, RbCl:In+, RbBr:In+, and RbI:In+ crystal systems.

EXAMPLE X

A silver color center within the scope of the present invention was prepared according to the method described in Example I, except that silver ions were substituted for thallium ions and potassium chloride was used as the host crystal. The resultant KCl:Ag+ crystal system had a silver cation concentration of about 0.1 mole percent. This crystal system was found to have an absorption band in the range of about 300 to 500 nanometers and a fluorescence emission band in the range of about 1.3 to 1.8 micrometers. Although optical bleaching was observed, this crystal system was found to be laser-active.

EXAMPLE XI

Another silver color center within the scope of the invention was prepared according to the method described in Example I, except that silver ions were substituted for thallium ions, and sodium chloride was used as a host crystal. The resultant NaCl:Ag+ system had a silver ion concentration of about 0.1 mole percent. This crystal system was found to have an absorption band in the range of about 300 to 500 nanometers and two fluorescence emission bands covering the range of about 1.0 to 1.6 micrometers.

EXAMPLE XII

Another silver color center within the scope of the invention was prepared according to the method described in Example I, except that silver ions were substituted for thallium ions, and rubidium chloride was used as a host crystal. The resultant RbCl:Ag+ system had a silver ion concentration of about 0.1 mole percent. This crystal system was found to have an absorption band in the range of about 300 to 500 nanometers and a fluorescence emission band covering the range of about 1.4 to 2.0 micrometers.

EXAMPLE XIII

Another silver color center within the scope of the invention was prepared according to the method described in Example I, except that silver ions were substituted for thallium ions, and potassium bromide was used as a host crystal. The resultant KBr:Ag+ system had a silver ion concentration of about 0.1 mole percent. This crystal system was found to have an absorption band in the range of about 300 to 500 nanometers and a fluorescence emission band covering the range of about 1.5 to 2.3 micrometers.

EXAMPLE XIV

Another silver color center within the scope of the invention was prepared according to the method described in Example I, except that silver ions were substituted for thallium ions, and rubidium bromide was used as a host crystal. The resultant RbBr:Ag+ system had a silver ion concentration of about 0.1 mole percent. This crystal system was found to have an absorption band in the range of about 300 to 500 nanometers and a fluorescence emission band covering the range of about 1.7 to 2.6 micrometers.

EXAMPLE XI

Other silver color center crystals within the scope of the present invention are made according to the procedures set forth with respect to Example I, except that silver ions are incorporated into a host crystal that is any one of sodium fluoride, sodium bromide, sodium iodide, potassium flouride, potassium iodide, rubidium fluoride, and rubidium iodide, thereby providing the respective $NaF;Ag^+$, $NaBr:Ag^+$, $NaI:Ag^+$, $KF:Ag^+$, $KI:Ag^+$, $RbF:Ag^+$, and $RbI:Ag^+$ crystal systems.

EXAMPLE XII

Other copper color center crystals within the scope of the present invention are made according to the procedures set forth with respect to Example I, except that copper ions are incorporated into a host crystal that is any one of sodium fluoride, sodium chloride, sodium bromide, sodium iodide, potassium fluoride, potassium chloride, potassium bromide, potassium iodide, rubidium fluoride, rubidium chloride, rubidium bromide, and rubidium iodide, thereby providing the respective $NaF:Cu^+$, $NaCl:Cu^+$, $NaBr:Cu^+$, $NaI:Cu^+$, $KCl:Cu^+$, $KF:Cu^+$, $KBr:Cu^+$, $KI:Cu^+$, $RbF:Cu^+$, $RbCl:Cu^+$, $RbBr:Cu^+$, and $RbI:Cu^+$ crystal systems.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of eqivvalency of the claims are to be embraced within their scope.

What is claimed and desired to be secured by United States Letters Patent is:

1. An optical resonator for causing the stimulated emission of radiation comprising:
    a laser material having laser-active color centers which include at least one monovalent heavy metal cation impurity and at least one anion vacancy, each of said color centers having at least one electron associated therewith;
    means for exciting said laser-active color centers to an excited state; and
    an optical resonant cavity for holding the laser material and capable of resonating so as to stimulate the emission of coherent radiation from said color centers.

2. An optical resonator as defined in claim 1 wherein the optical resonant cavity has a three-mirror, astigmatically compensated configuration and the laser material is located at the beam waist of said cavity.

3. An optical resonator as defined in claim 2 further comprising tuning means for tuning said emission from said color centers.

4. An optical resonator as defined in claim 3 wherein the tuning means is an optical grating rotatably mounted within the optical resonator.

5. A wavelength tunable laser comprising:
    a laser material having laser-active color centers which include at least one monovalent heavy metal cation impurity and at least one anion vacancy, each of said color center having at least one electron associated therewith;
    means for exciting said laser material to emit coherent radiation within the emission band of said laser material; and
    mirrors forming an optical resonator, said resonator enclosing the laser material and an optical grating for selecting a particular wavelength of said radiation within said resonator.

6. A wavelength tunable laser as defined in claim 5 wherein the optical grating is rotatably mounted within the optical resonator.

7. A method for generating color centers capable of laser activity, said method comprising the steps of:
    forming a crystal comprised of an alkali halide doped with monovalent heavy metal cation impurities;
    exposing said crystal to ionizing radiation so as to form F centers; and
    irradiating said crystal with light having at least one wavelength absorbed by the F centers, thereby aggregating the F centers with the cation impurities.

8. A method for generating color centers as defined in claim 7 wherein the alkali halide crystal is selected from the group consisting of sodium chloride, potassium chloride, potassium bromide, and rubidium chloride.

9. A method for generating color centers as defined in claim 7 wherein the alkali of the alkali halide crystal is selected from the group consisting of sodium, potassium, and rubidium.

10. A method for generating color centers as defined in claim 9 wherein the halide of the alkali halide crystal is selected from the group consisting of fluoride, chloride, bromide, and iodide.

11. A method for generating color centers as defined in claim 7 wherein the halide of the alkali halide crystal is selected from the group consisting of fluoride, chloride, bromide, and iodide.

12. A method for generating color centers as defined in claim 7 wherein the concentration of the cation impurities in the alkali halide cyrstal is in the range of about 0.05 to about 0.5 mole percent.

13. A method for generating color centers as defined in claim 7 wherein the cation impurity is thallium.

14. A method for generating color centers as defined in claim 13 wherein the alkali halide host crystal is selected from the group consisting of sodium chloride, potassium chloride, potassium bromide, and rubidium chloride.

15. A method for generating color centers as defined in claim 13 wherein the alkali of the alkali halide host crystal is selected from the group consisting of sodium, potassium, and rubidium.

16. A method for generating color centers as defined in claim 15 wherein the halide of the alkali halide host crystal is selected from the group consisting of fluoride, chloride, bromide, and iodide.

17. A method for generating color centers as defined in claim 13 wherein the halide of the alkali halide host crystal is selected from the group consisting of fluoride, chloride, bromide, and iodide.

18. A method for generating color centers as defined in claim 13 wherein the concentration of thallium impurity cations is in the range of about 0.05 to about 0.5 mole percent.

19. A method for generating color centers as defined in claim 7 wherein the cation impurity is gallium.

20. A method for generating color centers as defined in claim 7 wherein the cation impurity is indium.

21. A method for generating color centers as defined in claim 7 wherein the cation impurity is silver.

22. A method for generating color centers as defined in claim 7 wherein the cation impurity is copper.

23. A method for generating color centers as defined in claim 7 wherein the crystal is exposed to ionizing radiation at a crystal temperature at which anion vacancies can diffuse.

24. A method for generating color centers as defined in claim 7 wherein the crystal is exposed to ionizing radiation at a crystal temperature below that at which anion vacancies can diffuse, and further comprising the step of warming the crystal to a temperature at which anion vacancies can diffuse prior to irradiating the crystal with light having at least one wavelength absorbed by the F centers.

* * * * *

UNITED STATES PATENT AND TRADEMARK OFFICE
CERTIFICATE OF CORRECTION

PATENT NO.   :   4,672,619

DATED        :   June 9, 1987

INVENTOR(S)  :   Fritz Luty et al.

It is certified that error appears in the above-identified patent and that said Letters Patent is hereby corrected as shown below:

Column 2, line 68, "capability" should be --capability.--
Column 5, lines 54-55, "centers. include" should be --centers, include--
Column 7, line 3, "liSht" should be --light--
Column 7, line 8, "defects." should be --defects,--
Column 8, line 38, "enerey" should be --energy--
Column 8, line 63, "sizes." should be --sizes,--
Column 9, line 46, "dependance" should be --dependence--
Column 13, line 1, "EXAMPLE XI" should be --EXAMPLE XV--
Column 13, line 8, "flouride" should be --fluoride--
Column 13, line 13, "EXAMPLE XII" should be --EXAMPLE XVI--

Signed and Sealed this

Eighth Day of December, 1987

Attest:

DONALD J. QUIGG

*Attesting Officer*    *Commissioner of Patents and Trademarks*